United States Patent [19]

Ito et al.

[11] Patent Number: 4,469,269
[45] Date of Patent: Sep. 4, 1984

[54] METHOD OF MANUFACTURING THE PERIPHERAL WALL OF A TANK FOR AN OIL-IMMERSED ELECTRIC APPARATUS

[75] Inventors: Tatsuo Ito, Mie; Tadao Murata, Yokkaichi; Miyoshi Horiuchi, Suzuka; Masahiro Goto, Mie, all of Japan

[73] Assignee: Tokyo Shibaura Denki Kabushiki Kaisha, Kawasaki, Japan

[21] Appl. No.: 437,008

[22] Filed: Oct. 27, 1982

[30] Foreign Application Priority Data

Oct. 31, 1981 [JP] Japan .................. 56-175429

[51] Int. Cl.$^3$ .................. B23K 31/00; B23K 31/06
[52] U.S. Cl. .................. 228/173 C; 228/183
[58] Field of Search .................. 228/173 C, 183; 29/157.3 B, 157.3 D; 219/93, 94

[56] References Cited

U.S. PATENT DOCUMENTS 1,020,056  3/1912  Rietzel .................. 219/93
1,651,403 12/1927  Mougey .................. 228/183
3,397,440  8/1968  Dalin .................. 228/183

FOREIGN PATENT DOCUMENTS 2226512 8/1974 Fed. Rep. of Germany .
53820 12/1978 Japan .

Primary Examiner—Kenneth J. Ramsey
Assistant Examiner—M. Jordan
Attorney, Agent, or Firm—Oblon, Fisher, Spivak, McClelland & Maier

[57] ABSTRACT

A method of manufacturing the peripheral wall of a tank for an oil-immersed electric apparatus which comprises manufacturing a panel unit through the steps of:
fabricating a panel by pressing a thin steel sheet to form an upward extending flange along both edges of the panel and provide a plurality of reinforcement depressions concaved toward the backside of the flat portion of said panel;
folding the panel into two parts with the surface of the panel kept outside along the central line extending between both edges of the panel to fabricate a hollow fin;
joining both sides of the folded fin by spot welding the reinforcement depressions; and
welding together the closely facing edges of both sides of the fin,
and constructing the peripheral wall of the tank by joining together a plurality of panel units fabricated through the above-mentioned steps by welding the flanges of said panel units.

8 Claims, 19 Drawing Figures

METHOD OF MANUFACTURING THE PERIPHERAL WALL OF A TANK FOR AN OIL-IMMERSED ELECTRIC APPARATUS

BACKGROUND OF THE INVENTION

This invention relates to a method of manufacturing the peripheral wall of a tank for an oil-immersed electric apparatus.

A tank for an oil-immersed electric apparatus is generally so constructed as to assure effective heat release from the surface of said tank. The known method of elevating heat release from such tank includes the process of fitting heat-releasing fins to the peripheral wall of the tank; the process of fitting heat-releasing pipes to the peripheral wall of the tank which are designed to communicate with the interior of the tank on the upper and lower sides; the process of welding the peripheral seam of two superposed panels to provide a hollow panel element, assembling a plurality of panel elements thus constructed, providing the top and bottom of said assembly with headers communicating with the hollow panel elements and attaching the final constructed unit to the peripheral wall of the tank; and constructing the peripheral wall of the tank by bending the thin steel sheet into hollow heat-releasing fins communicating with the interior of the tank thereby to enlarge the area of heat release. In recent years, the last mentioned process is chiefly accepted.

FIG. 1 shows the conventional tank peripheral wall constructed by bending the thin steel sheet into the above-mentioned hollow heat-releasing fins. The tank peripheral wall 1 is constructed by the steps of bending a thin band shaped steel plate 2 by means of a press at a prescribed distance thereby to provide a corrugated plate consisting of a plurality of closely arranged fins 1a having a cross section indicated in FIG. 2, welding together the separate walls of both upper and lower ends of the fins 1a as illustrated in FIG. 3, and welding a reinforcement member 3 to each fin 1a.

FIG. 4 shows a tank for an oil-immersed electric apparatus, said tank comprising the above-mentioned peripheral wall 1. This tank is constructed by welding the upper and lower edges of the tank peripheral wall 1 respectively to the upper frame 4 of the tank and its lower frame 5 concurrently used as the tank bottom.

The conventional process of fitting an insulation oil in the tank of an oil-immersed electric apparatus, comprises previously drying the interior of the tank to remove moisture, in order to assure the insulating property of said insulation oil, and carrying out said filling in vacuum. The vacuum filling of the insulation oil in undertaken either by holding the tank in a vacuum vessel and filling the insulation oil in the tank in vacuum or by evacuating the tank in the atmosphere and then filling the insulation oil in said tank. However, large capacity vacuum vessel must be provided in order to adopt the former process in filling the insulation oil in a large tank such as that used for a large capacity transformer. Therefore, the latter process is widely accepted in filling the insulation oil in such large capacity tank. When, in the case of the aforesaid tank constructed by bending its peripheral wall to provide fins, the filling of the insulation oil in the tank is carried out by the latter method, then both thin lateral walls of each hollow fin 1a are concavely deformed when the tank is evacuates due to the excessively great difference between atmospheric pressures prevailing inside and outside of said hollow fin 1a, thus eventually resulting in the crush of the fin 1a. Further, with an oil immersed electric apparatus, the internal pressure of the tank increases due to the expansion of the insulation oil whose temperature rises with the heating of the electric apparatus. Since the aforementioned tank has a thin peripheral wall, both lateral walls of the fin 1a cannot withstand the increased internal pressure of the tank, and consequently are convexly deformed, resulting in the possibility that the internal area of the tank grown large to give rise to a drop in the oil level.

Therefore, with respect to a tank whose fins are constructed by bending the peripheral wall of said tank, it is necessary to reinforce the fins by proper means. Throughout FIGS. 1 to 4, reference numeral 6 denotes reinforcement depressions formed in both lateral walls of the fin 1a to increase its mechanical strength. The depressions 6 are chosen to have a round shape. After the peripheral wall of the tank is bent to provide fins 1a, the depressions 6 are formed by pressing. The mutually facing depressions 6 on both sides of the fins 1a are made to abut against each other as shown in FIGS. 2 and 3, thereby to support both sides of the fins 1a from the inside and prevent their concave deformation. Further, the abutting sections of the depressions 6 are spot welded to join both sides of the fins 1a, thereby preventing their convex deformation.

With an oil-immersed electric apparatus tank whose hollow heat-releasing fins are constructed by bending the peripheral wall of the tank, it is necessary to cause the fins 1a to extend outward as much as possible in order to enlarge a heat-releasing area and elevate the heat-releasing effect. Hitherto, however, the fins 1a have been formed by bending the peripheral wall of the tank, failing to let the fins 1a extend as much outward as desired and consequently presenting difficultes in elevating the heat-releasing effect. The fin-forming method includes, for example, a folding process (West German disclosed patent application 2,620,419) in addition to the pressing process. Said West German folding process comprises clamping a band shaped steel plate at two points and narrowing the clamped spot by knocking up the intermediate portion of said clamped spot. This folding process can indeed theoretically enable the fins to extend noticeably outward, but in still accompanied with the drawbacks that it is necessary to provide an enlarged knocking-up device and let the clamping device have a long movement stroke, eventually causing the fin-forming apparatus to have an undesirably large scale, and it is practically impossible to let the fins extend as much outward as desired.

Further, the conventional fin-forming process comprises fabricating reinforcement depressions 6 after bending the peripheral wall of the tank to provide fins, and joining both lateral walls of the respective fins by spot welding the abutting portions of the reinforcement depressions 6. In this case, the pressing fabrication of the reinforcement depressions 6 and the spot welding of the abutting portions thereof have to be carried out in a space defined between the adjacent fins 1a, consuming a great deal of time. Hitherto, therefore, it has been impossible to efficiently manufacture the finned peripheral wall of a tank for an oil-immersed electric apparatus.

SUMMARY OF THE INVENTION

It is accordingly the object of this invention to provide a method of manufacturing the peripheral wall of the tank for an oil-immersed electric apparatus which can provide a highly heat-releasing tank by fabricating hollow heat-releasing fins communicating with the interior of the tank on the peripheral wall thereof in such a manner that said fins can extend outward to a great extent, and the peripheral wall of the tank can be constructed efficiently.

To attain the above-mentioned object, this invention provides a method of manufacturing a tank for an oil immersed electric apparatus which comprises the steps of:

pressing a thin steel sheet to fabricate a panel, both facing edges of which an fitted with an upward extending flange and whose flat portion is provided with numerous backward concaved depressions;

fabricating hollow fins by bending the panel along a central line extending between both flanged edges of the panel with the surface of the panel kept outside;

joining both lateral walls of the respective fins by spot welding the bottom walls of the backward concaved depressions of said lateral walls;

producing a panel unit by welding the edge portions of both lateral walls of the respective fins; and constructing the finned peripheral wall of the tank by assembling the numerous panel units thus finished by welding the edges of the flanges of the respective fins.

The method of this invention has the advantages that a panel is folded in two parts to provide a fin, enabling the fin thus produced to extend outward to a greater extent than a fin fabricated by the conventional panel-pressing method, thereby providing a highly heat-releasing tank whose peripheral wall has a larger heat-releasing area than has been possible in the past; depression are formed before the fabrication of the fins for their reinforcement; the abutting edges of both lateral walls of the respective fins are spot welded before the peripheral wall of the tank is constructed; and since all the above-mentioned operations are carried out with great ease. The peripheral wall of a tank for an oil-immersed electric apparatus can be efficiently manufactured.

BRIEF DESCRIPTION OF THE DRAWINGS

FIG. 5 is an oblique view of a panel fabricated by pressing a thin steel sheet; FIG. 6 is a cross sectional view on line VI—VI of FIG. 5; FIG. 7 is a cross sectional view on line VII—VII of FIG. 5; FIG. 8 is an oblique view of a panel folded in two parts; FIG. 9 is an oblique view of the spot-welded abutting bottoms of the mutually facing backward concaved depressions formed in the panel; FIG. 10 is a front view of both walls of the fin whose mutually facing side edges are welded; FIG. 11 is a cross sectional view of the flanges whose deformed edges have been cut off to enable said flanges to properly abut against each other; FIG. 12 is an oblique view of adjacent panel units welded together; FIG. 13 is an oblique view of two reinforcement rods welded to the outer portions of the assembled panel units; FIG. 14 is a plan view of the oil-immersed electric apparatus tank whose peripheral wall has been constructed by the method of the invention; FIG. 15 is an enlarged cross sectional view of line XV—XV of FIG. 14; FIG. 16 is a fractional enlarged cross sectional view of FIG. 14; and FIG. 17 is an enlarged cross sectional view on line XVII—XVII of FIG. 15.

DETAILED DESCRIPTION OF THE PREFERRED EMBODIMENTS

Description is now given with the accompanying drawings of the sequential steps of manufacturing a tank for an oil-immersed electric apparatus according to one embodiment of this invention.

(Step 1)

Figure 1:
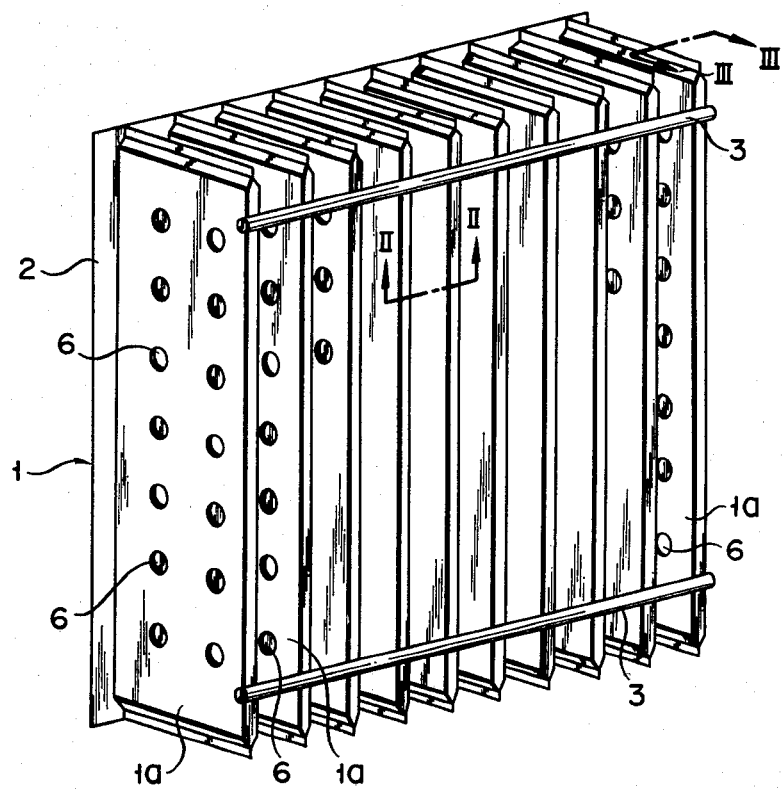
FIG. 1 is an oblique view of the peripheral wall of a tank for an oil-immersed electric apparatus manufactured by the conventional method.
Figure 2:
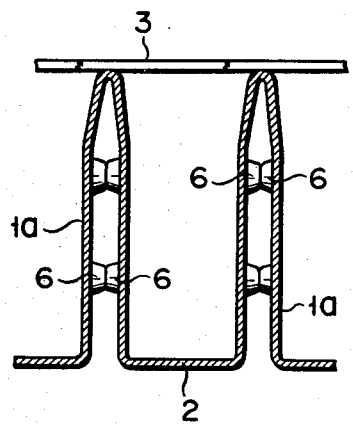
FIG. 2 is an enlarged cross sectional view on line II—II of FIG. 1.
Figure 3:
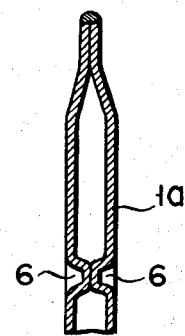
FIG. 3 is an enlarged cross sectional view on line III—III of FIG. 1.
Figure 4:
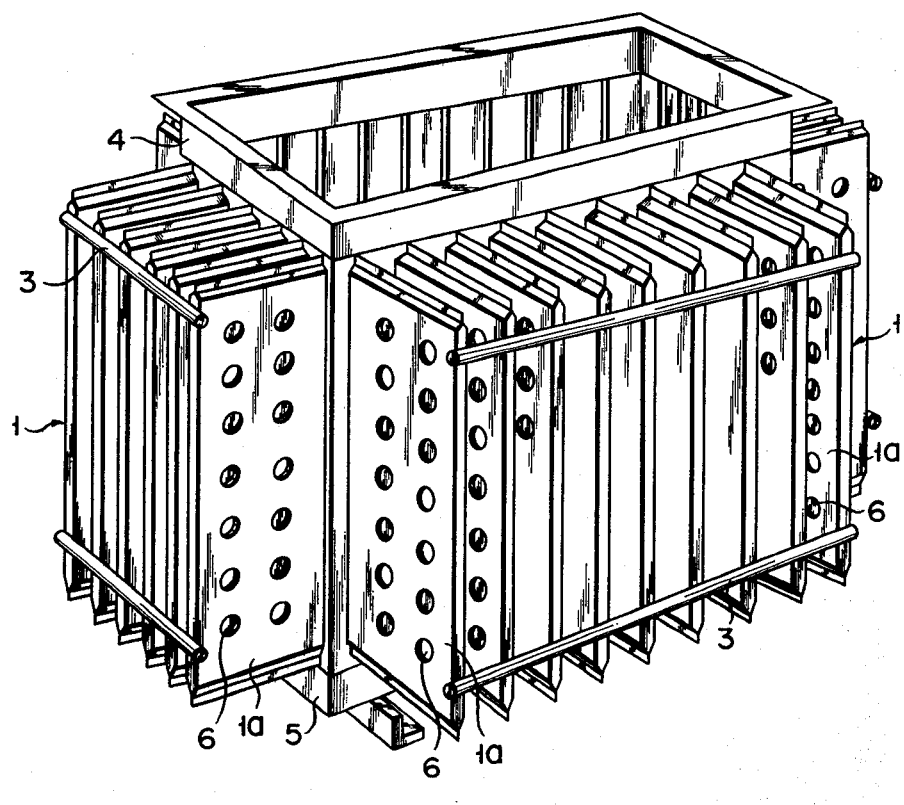
FIG. 4 is an oblique view of oil-immersed electric apparatus tank comprising the peripheral wall of FIG. 1.
Figure 5:
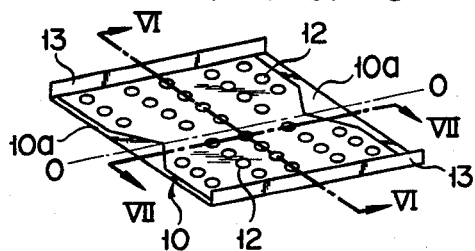
FIG. 5 to FIG. 17 indicate the sequential steps of manufacturing an oil-immersed electric apparatus tank embodying this invention.
Figure 6:
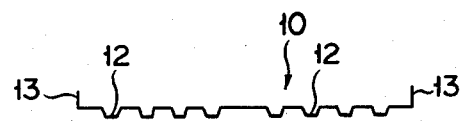
Figure 7:
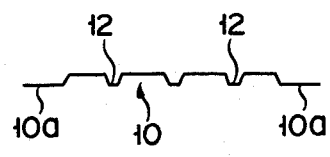

A thin steel sheet having a prescribed size is pressed into a panel 10 shown in FIGS. 5 to 7. This panel 10 comprises a flange 13 upward extending from both edges of said panel; and a large number of depressions 12 concaved toward the backside of said panel 10 and provided in the flat portion of the panel 10 which is defined between the flanges 13. The panel 10 further comprises elongate depressions 10a formed along both edges of said flat portion. These depressions 10a are also concaved toward the backside of the flat portion with the same depth as the aforesaid depressions 12. Said depressions 12 are made into a small circle or elliptic form, and arranged in symmetric relationship with respect to the center line 0—0 extending between both flanges 13, 13 of the panel 10. The panel 10 can be fully fabricated by a single pressing operation.

(Step 2)

Figure 8:
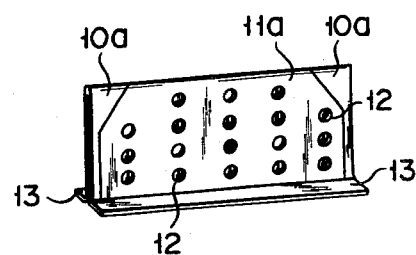

The panel 10 is folded into two parts with its surface kept outside along the central line 0—0 of FIG. 5 to provide a hollow fin 11a as shown in FIG. 8. In this case the depressions 12 symmetrically arranged with respect to the center line 0—0 abut against each other at the bottom in the interior of the fin 11a. Similarly, the aforesaid elongate depressions 10a extending along the edges of both lateral walls of the fin 11a abut against each other at the bottom.

(Step 3)

Figure 9:
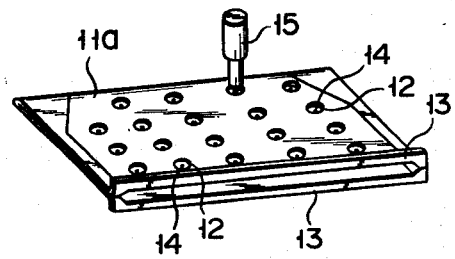

Both lateral walls of the fin 11a are joined together by spot welding said backward concaved depressions 12. FIG. 9 shown the operation of spot-welding the depressions 12. Reference numeral 14 given in FIG. 9 denotes the spot welded portion of said depression 12. Reference numeral 15 represents a welding electrode.

(Step 4)

Figure 10:
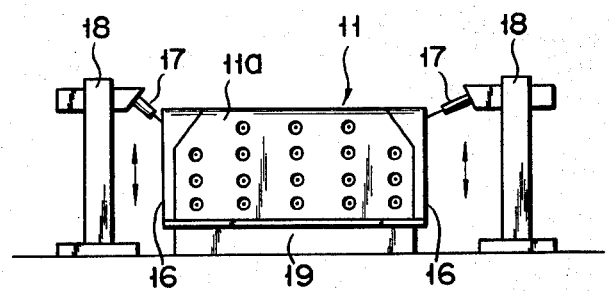

The edges of both lateral walls of the fin 11a are welded together. FIG. 10 shows the operation of welding the edges of both lateral walls of the fin 11a. Reference numeral 16 shown the welded section; reference numeral 17 indicates a welding torch; reference numeral 18 denotes a manipulator; and reference numeral 19 represents a pedestal. In the foregoing embodiment, the edges 10a of both lateral walls of the fin 11a are concaved toward the backside of the panel 10 (that is, toward the interior of the fin 11a). At the time of welding therefore, the edges of both lateral wells of the fin 11a need not be purposely pressed against each other as practised in the conventional method of manufacturing the peripheral wall of a tank for an oil-immersed electric apparatus.

The foregoing Steps 1 to 4 provide a panel unit 11 comprising a hollow fin 11a open only at the base and outward extending flanges 13 mounted on both sides of the fin base. The peripheral wall of the tank is later fabricated by the following steps.

(Step 5)

Figure 11:
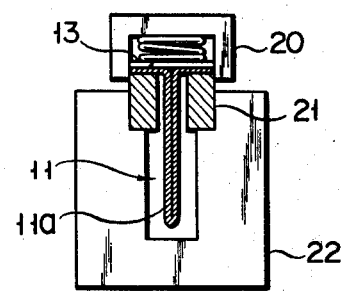

The outer edge of the flange 13 of the panel unit 11 is deformed to some extent by the effect of pressing applied during the fabrication of the panel unit 10. To reduce, therefore, as much as possible a distance which might be unavoidably widened due to the aforementioned deformation between the respective adjacent panel units welded in the succeeding Step 6, the outer determined edge of the flange 13 is cut off by pressing to render said edge straight. FIG. 11 illustrates the above-mentioned cutting operation. Reference numeral 20 denotes the upper section of a die, and reference numeral 21 represents the lower section thereof. Reference numeral 22 represents the holder.

(Step 6)

Figure 12:
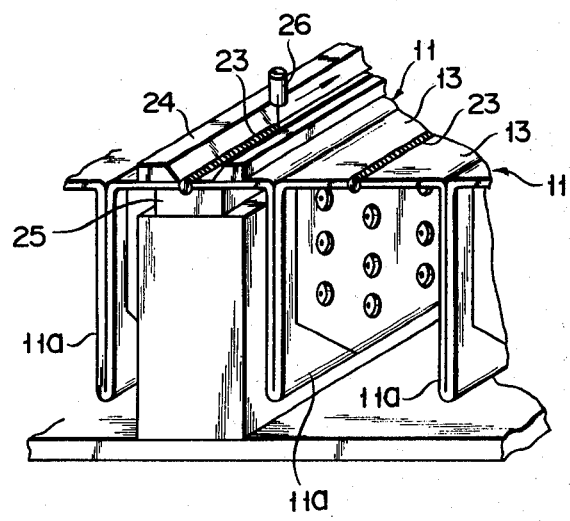

A plurality of panel units fabricated through the above listed steps are joined together by butt-welding or lap-welding of the flanges 13 to construct the peripheral wall of the tank. FIG. 12 shows the operation of butt-welding flanges 13. Reference numeral 23 indicates a butt-welded section; reference numeral 24 denotes a holding metal part; reference numeral 25 represents a back cover plate; and reference numeral 26 shows a welding torch.

(Step 7)

Figure 13:
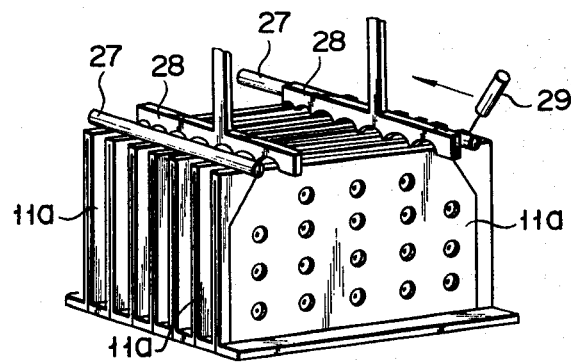
Figure 14:
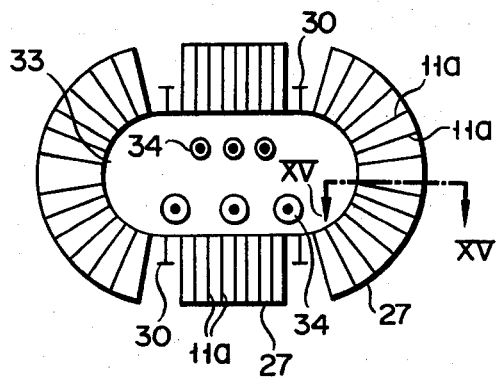
Figure 15:
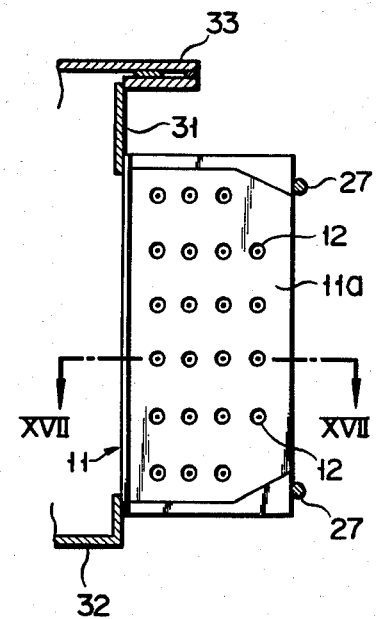
Figure 16:
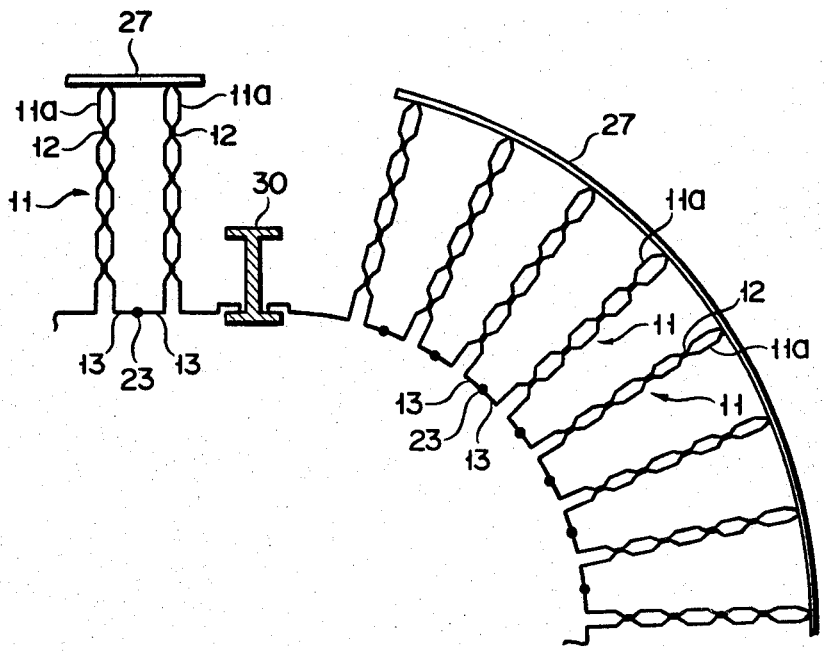
Figure 17:
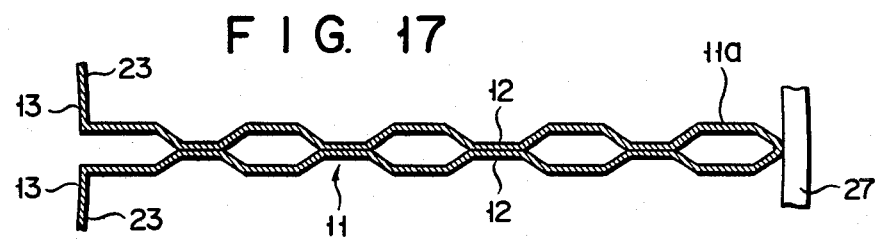

A reinforcement connecting member 27 is welded to the outer edges of the fins 11a of the jointly welded panel units. FIG. 13 illustrates the welding of said connecting member 27. Reference numeral 28 denotes a jig used to arrange the respective fins 11a at a prescribed distance; and reference numeral 29 is a welding torch.

FIGS. 14 to 17 indicate a tank for an oil-immersed electric apparatus whose peripheral wall is fabricated in the aforementioned manner. Reference numeral 30 denotes a longitudinal reinforcement beam. Reference numeral 31 shows the upper frame of the tank. Reference numeral 32 indicates the lower frame of the tank concurrently used as the bottom plate thereof. Reference numeral 33 is the upper cover of the tank. Reference numeral 34 shows an insulation bushing mounted on the upper cover 33.

The advantages of the method of this invention for manufacturing a tank used with an oil-immersed electric apparatus may be listed as follows. A panel 10 fabricated by pressing a thin steel sheet is folded into two parts thereby to provide a hollow fin 11a. Even a large panel 10 can be easily folded, producing a fin extending widely outward whose fabrication has been impossible with the conventional method. As a result, it is possible to manufacture a highly heat-releasing tank whose peripheral wall as a prominently enlarged heat-releasing area. When the panel 10 is fabricated, the reinforcement depressions 12 are formed at the same time, allowing for the easier formation of said depressions 12. Both lateral walls of the fin 11a are easily jointed together by the spot welding of said depressions 12 under the condition in which no adjacent fin lies near. The respective panel units 11 are joined together simply by driving a welding torch linearly along the abutting sections of the flanges 13, thereby enabling the tank to be manufactured efficiently. The fins 11a coupled together by the reinforcement connecting member 27 eliminate the occurrence of difficulties in the mechanical strength of the tank which might otherwise arise due to the vibration of said tank or any other cause, even when the fin 11a is made to extend widely outward.

Figure 18:
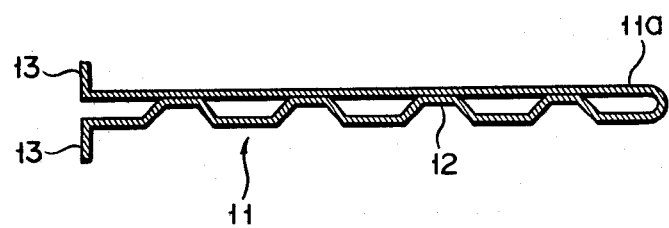
FIG. 18 is an enlarged cross sectional view of a modified fin.
Figure 19:
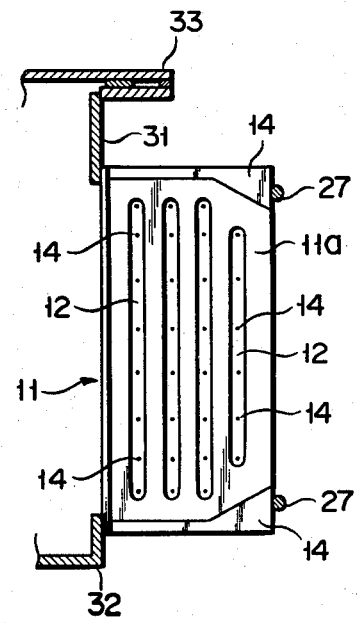
FIG. 19 is a cross sectional view of the peripheral wall of the tank indicating a plurality of elongated reinforcement depressions modified from those of the first mentioned embodiment.

The description of the foregoing embodiment refers to the case where reinforcement depressions 12 were formed in both lateral walls of the fin 11a. As illustrated in FIG. 18, however, it is possible to form such reinforcement depressions 12 in only one of both lateral walls of the fin 11a, and join said both lateral walls by the spot welding of the reinforcement depressions 12. In such case, the reinforcement depressions 12 have to be formed only in one of the half sections of the flat portion of the thin steel sheet divided by the center line O—O in fabricating the panel 10 shown in FIG. 5. Further, it will well serve the purpose, if the depressed portions 10a are formed along the edge of only that half section of the flat portion in which the reinforcement depressions 12 are provided. It is advised to form the reinforcement depressions 12 in such a number as well accords with the size of the fin 11a to be fabricated. The reinforcement depressions 12 may be optionally arranged, for example, in the staggered fashion. In the foregoing embodiment, the reinforcement depressions 12 assumed a small circular or elliptic form. As indicated in FIG. 19, however, said reinforcement depressions 12 may assure the form of an elongated groove. Reference numeral 14 denotes a spot welded section. The provision of the above-mentioned elongated depressions 12 suppresses the deformation of the fin 11a resulting from the internal and external stresses, and elevates the mechanical strength of said fin 11a by enlarging the modulus of elasticity.

The above-described method of this invention for manufacturing the peripheral wall of a tank used with an oil-immersed electric apparatus allows for the efficient construction of the peripheral wall of the tank fitted with a plurality of hollow heat-releasing fins communicating with the interior of the tank, with the fins made to extend broadly ourward, thereby rendering said tank highly heat-releasing.

What we claim is:

1. A method of manufacturing the peripheral wall of a tank for an oil-immersed electric apparatus which comprises manufacturing a panel unit through the steps of:

fabricating a panel by pressing a thin steel sheet to form an upward extending flange along both edges of the panel and provide a plurality of reinforcement depressions concaved toward the backside of the flat portion of said panel;

folding the panel into two parts with the surface of the panel kept outside along the central line extending between both edges of the panel to fabricate a hollow fin;

joining both sides of the folded fin by spot welding the reinforcement depressions; and welding together the closely facing edges of both sides of the fin, and constructing the peripheral wall of the tank by joining together a plurality of panel units fabricated through the above-mentioned steps by welding the flanges of said panel units.

2. The method according to claim 1, wherein the panel is fabricated by forming the reinforcement depressions in symmetrical relationship with respect to a parallel central line extending between both lateral edges of the thin steel sheet.

3. The method according to claim 1, wherein the panel is fabricated by forming the reinforcement depressions only in one of the half sections of the panel devided by the central line.

4. The method according to claim 2, wherein the fabrication of the panel comprises the step of forming an elongate depression which is concaved toward the backside of the panel with the same depth as the reinforcement depressions and extends all along both edges of the flat portion of the panel which intersect the flanged edges thereof at right angles.

5. The method according to claim 3, wherein the fabrication of the panel conprises the step of forming an elongate depression which is concaved toward the backside of the panel with the same depth as the reinforcement depressions and extends along both edges of the flat portion of the panel intersecting the flanged edges thereof at right angles, the formation of said elongate depression being formed only in that half portion of the panel which is provided with the reinforcement depressions.

6. The method according to claim 1, 2, 3, 4 or 5, wherein the reinforcement depressions are formed in the panel with a small diameter.

7. The method according to claim 1, 2, 3, 4 or 5, wherein the reinforcement depressions are provided in the form of an elongate groove.

8. The method according to claim 1, 2, 3, 4 or 5, wherein the construction of the peripheral wall of the tank comprises the step of joining the fins of a plurality of panel units by a reinforcement connecting member.

* * * * *